Figure 1:
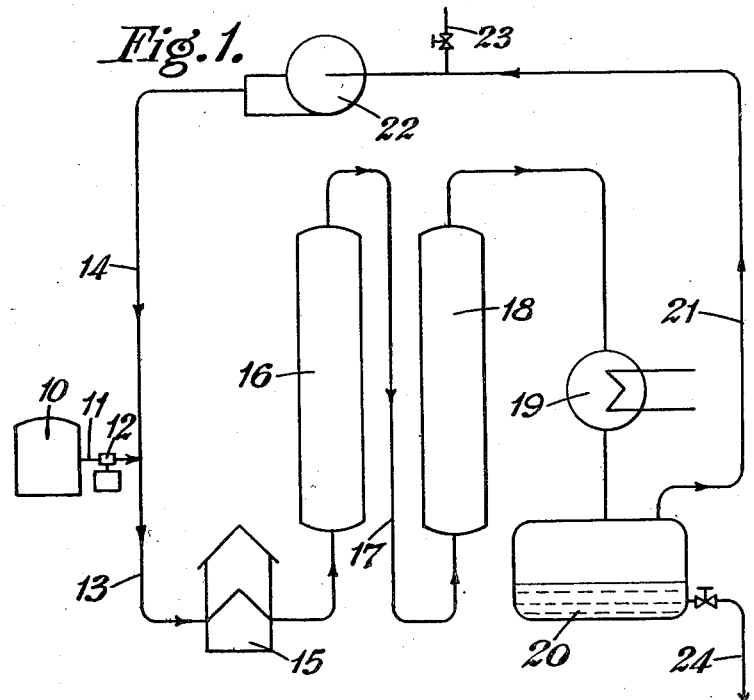

Nov. 6, 1956   F. W. B. PORTER ET AL   2,769,758
REMOVAL OF SODIUM AND VANADIUM FROM PETROLEUM HYDROCARBONS
FOLLOWED BY CATALYTIC DESULPHURISATION OF
SAID PETROLEUM HYDROCARBONS

Filed March 13, 1952   2 Sheets-Sheet 1

Inventors:
FREDERICK WILLIAM BERTRAM PORTER
& JOHN SHUTE ISITT

By:

Attorneys

Nov. 6, 1956     F. W. B. PORTER ET AL     2,769,758
REMOVAL OF SODIUM AND VANADIUM FROM PETROLEUM HYDROCARBONS
FOLLOWED BY CATALYTIC DESULPHURISATION OF
SAID PETROLEUM HYDROCARBONS

Filed March 13, 1952     2 Sheets-Sheet 2

Iventors:
FREDERICK WILLIAM BERTRAM PORTER
& JOHN SHUTE ISITT
By:     Attorneys

United States Patent Office 2,769,758
Patented Nov. 6, 1956

2,769,758

REMOVAL OF SODIUM AND VANADIUM FROM PETROLEUM HYDROCARBONS FOLLOWED BY CATALYTIC DESULPHURISATION OF SAID PETROLEUM HYDROCARBONS

Frederick William Bertram Porter and John Shute Isitt, Sunbury-on-Thames, England, assignors to The British Petroleum Company Limited Application March 13, 1952, Serial No. 276,256

Claims priority, application Great Britain March 20, 1951

2 Claims. (Cl. 196—28)

This invention relates to the hydrocatalytic desulphurisation of petroleum hydrocarbons and is particularly concerned with the hydrofining process wherein a sulphur-containing petroleum oil is passed in admixture with hydrogen over a sulphur-resistant hydrogenation catalyst under conditions of temperature and pressure such that organically combined sulphur contained in the oil is converted to hydrogen sulphide. A suitable catalyst for the hydrofining process has been found to be the so-called cobalt molybdate catalyst which consists of the oxides of cobalt and molybdenum preferably deposited on or incorporated with a support, e. g. alumina.

The hydrofining of crude petroleum residues is well known while a more recent development of the hydrofining process has been its application to the desulphurisation of crude petroleum. The present invention is particularly concerned with an improvement in the hydrofining of crude petroleum and crude petroleum residues.

The higher boiling fractions of crude petroleum often contain traces of vanadium and sodium and it has been shown that in the hydrofining of crude petroleum and petroleum residues substantial proportions of the vanadium and sodium present in the oil are removed by and deposited on the catalyst and that this deposition causes a steady decline in the catalyst activity with hours on stream which is not wholly recovered on regeneration in the conventional manner.

In order to confirm that this loss of catalyst activity was due to the deposition of sodium and vanadium three cobalt molybdate-on-alumina catalysts were impregnated with sodium and vanadium in quantities equivalent to those which would be deposited from crude petroleum during 1000 hours of hydrofining. These amounts were as follows:

Catalyst A _____ 1.6% wt. vanadium added.
Catalyst B _____ 1.3% wt. sodium added.
Catalyst C _____ 1.6% wt. vanadium and 1.3% sodium added.

The activities of the catalysts were determined by their desulphurisation of the gas oil containing added thiophene in which test the desulphurisation obtained with the untreated cobalt molybdate catalysts was taken as 100. The results obtained were as follows:

|  | Relative degree of desulphurisation |
|---|---|
| Original catalyst with no vanadium or sodium added | 100 |
| Catalyst A | 70 |
| Catalyst B | 60 |
| Catalyst C | 40 |

These results show that vanadium and sodium, both singly and taken in conjunction, have a detrimental effect on the activity of the catalyst.

It was subsequently discovered that the use of a natural bauxite catalyst under hydrofining conditions removed the vanadium and sodium present in crude petroleum. Experiments were therefore carried out using a bauxite charge prior to the cobalt molybdate catalyst during the hydrofining of crude oil and it was found that substantial reduction was obtained in the decline of catalyst activity with hours on stream.

According to the invention, therefore, a process for the hydrocatalytic desulphurisation of a petroleum feedstock containing vanadium and/or sodium, comprises passing the feedstock into contact with bauxite at an elevated temperature and pressure such that a considerable proportion of the vanadium and sodium contained in the feedstock is retained by the bauxite, and thereafter passing the treated feedstock to a hydrofining zone.

The conditions which are most favourable for the removal of vanadium from petroleum feedstocks are not the most favourable for the removal of sodium and vice versa. For example, on treating a Kuwait residue over bauxite at 780° F., 1000 p. s. i. ga., 1.0 v./v./hr. and 4000 S. C. F./B. recycle rate, the vanadium removal over 100 hours was approximately 50% and the sodium removal 30%. On treating the same feedstock over bauxite at 780° F., 1000 p. s. i. ga. and 1.0 v./v./hr. but without hydrogen recycle, vanadium removal was only approximately 10%, whereas sodium removal was over 90%. The feedstock employed contained 35 p. p. m. vanadium and 35 p. p. m. sodium, the bulk of the sodium being of extraneous origin introduced during distillation of the crude.

It is considered that vanadium removal is primarily a hydrogenation process which is dependent, among other things, upon the hydrogen partial pressure, while the removal of extraneous or uncombined sodium is primarily a physical process, the efficiency of which is not improved by the presence of hydrogen which competes with the sodium for the adsorbing surface of the bauxite. Whether this explanation is correct or not, it has been discovered that improved removal of vanadium and sodium may be effected by a two-stage treatment over bauxite, only one stage being carried out in the presence of hydrogen.

According to a further feature of the invention therefore, the contacting of the feedstock is effected in two stages, the first stage being in the absence of hydrogen, whereby substantially all the sodium is removed from the feedstock, and the second stage in the presence of hydrogen, whereby a considerable proportion of the vanadium is removed from the feedstock.

The two-stage treatment with bauxite may advantageously be carried into effect in a tower containing a single bed of bauxite, recycled hydrogen being admitted to the tower at a point calculated to afford the optimum space velocities for both sodium and vanadium removal.

The conditions of temperature and pressure employed in the bauxite pre-treating zone are preferably those normally employed in hydrofining processes, that is to say a temperature of about 700 to 850° F. and a pressure between about 800 and 1000 p. s. i. ga.

The catalyst employed in the hydrofining zone is preferably cobalt molybdate on alumina.

The invention is particularly applicable to the treatment of crude petroleum or petroleum residue and will hereinafter be described with relation to such feedstocks.

The pre-treatment of the feedstock with bauxite was found to effect a substantial reduction in the decline of activity of the cobalt molybdate catalyst in the hydrofining zone with hours on stream. It was also found that the cobalt molybdate catalyst regained its full activity on regeneration whereas without the bauxite pre-treatment of the feedstock the activity of the cobalt molybdate catalyst was only partially restored on regeneration due to the vanadium and sodium which remained deposited on it.

The bauxite charge was found to remain active for at least 1000 hours. The spent bauxite provides a valuable raw material for the recovery of vanadium or it can be used in other processes e. g. as an improved catalyst for catalytic desulphurisation by the Perco process or for the finishing treatment of kerosines for colour and char improvement, or for use in sulphur recovery in Claus or similar processes. The invention will now be described with reference to the accompanying drawings comprising Figures 1 to 3.

Referring first to Figure 1, crude petroleum from tank 10 is fed via line 11 and feed pump 12 to line 13 and thence in admixture with hydrogen, supplied via line 14, to heater 15 and reactor 16 which is charged with bauxite and maintained at a temperature of 780° F. and a pressure of 1000 p. s. i. ga. The products from reactor 16 are passed via line 17 to hydrofining zone 18 charged with cobalt molybdate on alumina and maintained at the same temperature and pressure as reactor 16. The hydrofined products are cooled in cooler 19 and then passed to a high pressure separator 20. A gas consisting mainly of hydrogen is separated off by line 21 and recycled into admixture with the incoming feed via recycle gas booster 22. Make-up hydrogen required to maintain the necessary pressure is supplied via valved line 23. The liquid product in the high pressure separator 20 contains the bulk of the hydrogen sulphide (produced in the hydrofining zone) dissolved therein and is removed via valved line 24. The product is subsequently depressurised to release the dissolved $H_2S$.

Figure 2:
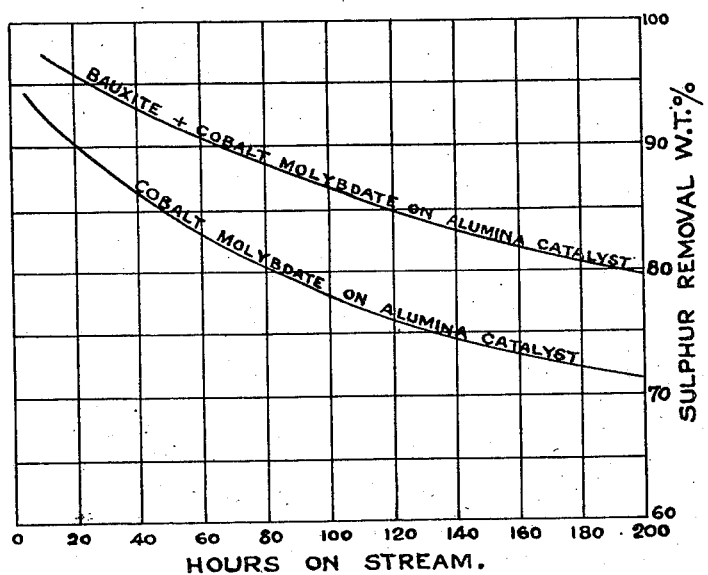

The above process was carried out on crude petroleum over 200 hours and a similar process was carried out over 200 hours omitting the bauxite pre-treatment. Figure 2 shows graphically a comparison of the sulphur removals obtained in the two processes. Inspection data on the bulked products from the two processes are given in the following table.

Table

| Catalyst | | Cobalt Molybdate on Alumina | |
|---|---|---|---|
| | Feedstock | Alone | Prior Bauxite Treatment |
| | | Bulked Product | Bulked Product |
| Hours on Stream | — | 0–200 | 0–200 |
| Yield of Products, percent wt.: | | | |
| $H_2S$ | — | 2.04 | 2.14 |
| Gas $C_1$–$C_3$ | — | 0.80 | 1.90 |
| Gasoline+Butane | 0.40 | 14.58 | 17.05 |
| Kerosine, 149–232° C. | 14.89 | 14.84 | 16.69 |
| Gas Oil, 232–343° C. | 12.38 | 21.22 | 21.93 |
| Heavy Gas Oil, 343–371° C. | 16.77 | 5.17 | 5.89 |
| Residue, >371° C. | 3.95 | 41.35 | 34.40 |
| | 51.61 | | |
| Properties of Products: | | | |
| Gasoline— | | | |
| Sulphur, percent wt. | 0.021 | 0.004 | 0.005 |
| Octane Number (C. F. R. M.), 100% $C_4$ | 52.9 | 59.5 | 59.7 |
| Kerosine—Sulphur, percent wt. | 0.175 | 0.018 | 0.010 |
| Gas Oil— | | | |
| Sulphur, percent wt. | 1.23 | 0.14 | 0.11 |
| Diesel Index | 58 | 56 | 55 |
| Pour Point, ° F. | 5 | −5 | 0 |
| Heavy Gas Oil— | | | |
| Sulphur, percent wt. | 2.37 | 0.35 | 0.41 |
| Pour Point, ° F. | 45 | 45 | 40 |
| Viscosity Redwood I @ 100° F., sec. | 50.5 | 48.4 | 48.6 |
| Residue, >371° C.— | | | |
| Sulphur, percent wt. | 4.22 | 0.84 | 0.67 |
| Pour Point, ° F. | 70 | 50 | 50 |
| Viscosity Redwood I @ 100° F., sec. | 9,750 | 950 | 566 |
| Hard Asphalt, percent wt. | 0.82 | 0.96 | 0.59 |
| Hydrogen Consumption, C. F./B. | Nil | 382 | 450 |
| Vanadium (parts per million) | 25 | 10 | 1.9 |
| Sodium (parts per million) | 6 | 4 | 0.4 |

Figure 3:
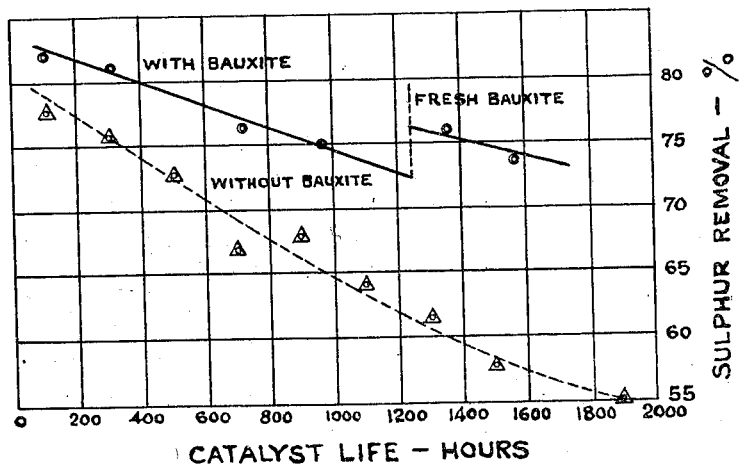

The increase in the life of the hydrofining catalyst to be obtained by the use of a bauxite guard chamber according to the present invention is further illustrated in the accompanying Figure 3. The graph shown therein plots the sulphur removal against the catalyst life and the data upon which the graph is based were obtained during the treatment of a Kuwait crude oil with and without a bauxite guard chamber under the following conditions which apply to both the bauxite chamber and the hydrofining reactor unless otherwise stated.

| | |
|---|---|
| Pressure | 1000 p. s. i. ga. |
| Temperature | 780° F. |
| Space velocity | 1.0 v./v./hr. |
| Gas recycle rate | 4000 C. F./B. |
| Catalyst in hydrofining reactor | Cobalt and molybdenum oxides on alumina. |
| Reaction period before regeneration: | |
| Without bauxite guard chamber | 200 hours. |
| With bauxite guard chamber | 200 to 400 hours. |

No regeneration of the bauxite was carried out but this was replaced with a fresh charge after about 1250 hours life.

It is estimated from the above data that the life of a catalyst without a bauxite guard chamber for the hydrofining of crude oil under the stated conditions would be approximately 2800 hours before the desulphurisation fell to what was considered an uneconomic level, whereas the use of a bauxite guard chamber extends the life of the catalyst to approximately 10,000 hours under similar operating conditions.

We claim:

1. A process for the hydrocatalytic desulphurisation of a petroleum feedstock containing vanadium and sodium and selected from the class consisting of crude oils and crude oil residues, which comprises passing the feedstock in admixture with hydrogen to a zone where it is contacted with a catalyst consisting essentially of bauxite at a temperature between 700 and 850° F. and a pressure between 80 and 1000 p. s. i. ga., whereby a considerable proportion of the vanadium and sodium contained in the feedstock is retained by the bauxite, passing the products from the bauxite-contacting zone to a hydrofining zone wherein said products are contacted at elevated temperature and pressure with a sulphur-resistant hydrogenation catalyst, separating hydrogen sulphide from the products from the hydrofining zone, and recovering a product having a substantially reduced sulphur content.

2. A process according to claim 1, wherein said sulphur-resistant hydrogenation catalyst is selected from the class consisting of mixtures of the oxides of cobalt and molybdenum, chemical compounds of cobalt, molybdenum and oxygen, and mixtures of said oxides with said compounds.

References Cited in the file of this patent

UNITED STATES PATENTS

| | | |
|---|---|---|
| 2,009,710 | Goodwin | July 30, 1935 |
| 2,383,972 | Jones | Sept. 4, 1945 |
| 2,384,315 | Kuhl | Sept. 4, 1945 |
| 2,417,308 | Lee | Mar. 11, 1947 |
| 2,450,724 | Grote | Oct. 5, 1948 |
| 2,507,523 | Houdry | May 16, 1950 |
| 2,573,726 | Porter et al. | Nov. 6, 1951 |
| 2,687,985 | Porter et al. | Aug. 31, 1954 |

OTHER REFERENCES

Mills et al.: Petroleum Refiner, 30 (No. 9) pp. 97–102 (1951).